Aug. 13, 1929.　　　H. SCHLAICH　　　1,724,520
MEASURING INSTRUMENT
Filed March 3, 1924　　　2 Sheets-Sheet 1

INVENTOR
Herman Schlaich
BY
ATTORNEYS

Aug. 13, 1929.  H. SCHLAICH  1,724,520
MEASURING INSTRUMENT
Filed March 3, 1924  2 Sheets-Sheet 2
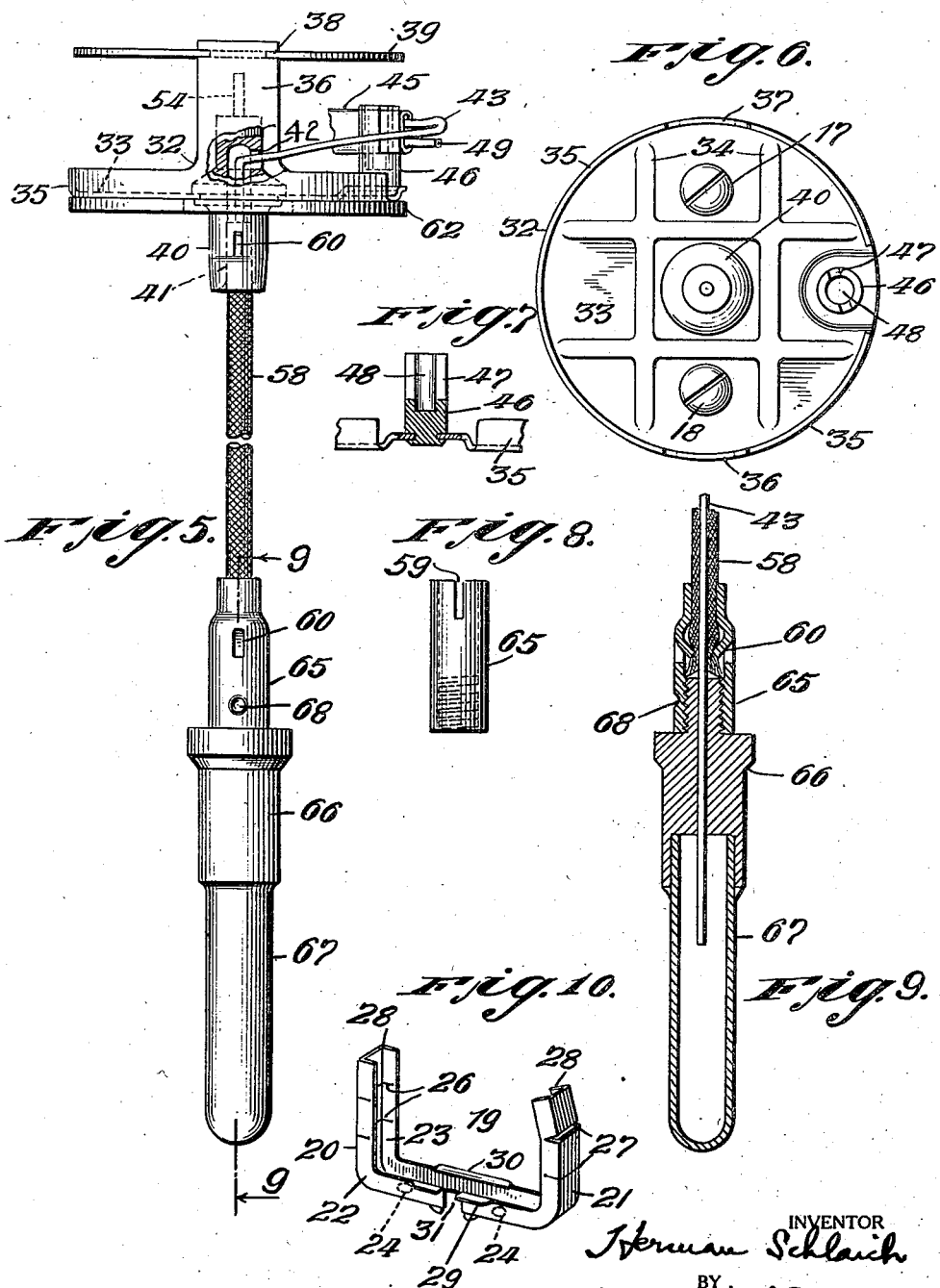

Patented Aug. 13, 1929.

1,724,520

UNITED STATES PATENT OFFICE.

HERMAN SCHLAICH, OF LONG ISLAND CITY, NEW YORK.

MEASURING INSTRUMENT.

Application filed March 3, 1924. Serial No. 696,563.

The present invention relates to improvements in instruments, and is more particularly directed toward the provision of an instrument suitable for mounting on the instrument board of an automobile, such, for example, as an improved distance-type thermometer for indicating the temperature of the cooling system of the automobile engine. This, however, is only one of the various uses in which the various features of the present invention may be employed.

These instruments should be so designed that they may be readily assembled. They should also be of rugged construction so as to be unlikely to be injured in use, and should be so constructed that they are unlikely to get out of order, or to give improper indications of the condition which they are intended to show to the observer. There are many instruments, including the type above mentioned, which are generally sold at automobile accessories to be mounted by the dealer or purchaser on the instrument board already provided on the car. The commercial success of these devices and their salability as accessories, depends, to a considerable extent, upon the facility with which they may be installed on the purchaser's car.

The thickness of instrument boards on automobiles is not standardized by the various manufacturers, and for this reason it may be somewhat difficult to fasten such an accessory to the instrument board, unless the fastening devices provided are adapted to instrument boards of varying thicknesses. The present invention therefore contemplates the provision of suitable means whereby this mounting may be readily accomplished in a facile and economical manner irrespective of the thickness of the instrument board.

The invention also contemplates the provision of an instrument in which the parts are so designed that they may be readily assembled into a compact structure suitable for the purposes above referred to. It contemplates an instrument well adapted for mounting on an instrument board without affecting the operating parts or disturbing the adjustment of the instrument.

Certain instruments such as distance-thermometers are provided with a long tube of small diameter connecting the temperature responsive element with the indicating element. This tube is generally provided with a protecting covering such as a braided wire sheath, and the present invention contemplates the provision of improved means for and methods of coupling the parts of the instrument so that the ends of the braided sheath will be securely held to prevent unraveling thereof.

Other objects of the invention will be pointed out hereinafter, or will be apparent as the description proceeds.

The accompanying drawings show one form of distance-type thermometer, which is one of the many possible embodiments of the invention, it being understood that the drawings are illustrative of the invention which may be embodied in various forms. In these drawings:

Fig. 5 shows in elevation the temperature responsive element, and also shows in elevation certain of the parts of the instrument which are carried on the instrument board;

Fig. 6 is a top plan view of an inner sheet metal stamping which supports certain parts of the instrument;

Fig. 7 is a view, parts being shown in section, illustrating the securing of the attaching post for the pressure responsive element;

Fig. 8 is an elevational view of a member used to couple the flexible tube and braid to a rigid element;

Fig. 9 is a section taken along the line 9—9 of Fig. 5; and

Fig. 10 is a perspective view of a bridging or clamping member.

Figure 1:
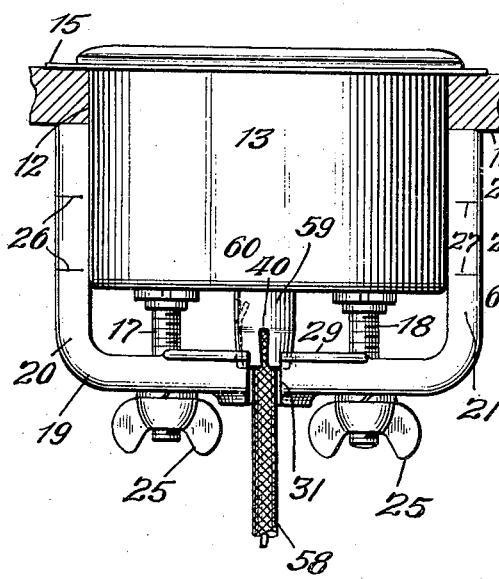
Fig. 1 is an elevational view showing an instrument mounted on a section of an instrument board.
Figure 3:
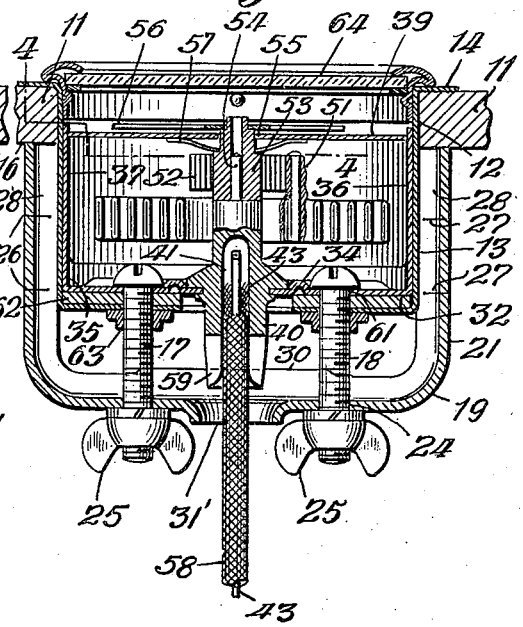
Fig. 3 is a section taken on the line 3—3 of Fig. 2.

A fragment of a conventional instrument board is illustrated at 11 in Figs. 1 and 3. This board is provided with an aperture 12 of just the proper size to readily receive the protecting casing 13 of an instrument. The outer end of this casing, which is here shown in the form of a cup-shaped stamping, is provided with an outwardly directed flange or shoulder 14 adapted to engage the upper or front side 15 of the instrument board. The casing extends rearwardly beyond the back side 16 of the board and houses the operating mechanism of the instrument, which mechanism will be described below.

The casing is associated with suitable devices for fastening it, together with the mechanism therein contained, onto the instrument board. As here shown, these devices are in the form of a pair of threaded studs 17 and 18 extending rearwardly from the projecting end of the casing, and a bridging or clamping member 19, preferably U-shaped, which co-operates with these studs and the back of the instrument board.

This U-shaped member is shown in detail in Figs. 1, 3, and 10, wherein it appears in the form of a sheet metal stamping, with the sides 20 and 21 of the U spaced to accommodate the casing, and somewhat longer than the casing is deep. This stamping is of channel cross-section in order to be stiffened, the sides 22 and 23 of the channel being inwardly directed as shown. The studs 17 and 18 pass through holes 24 in this bridging member, and nuts 25 are provided for forcing the bridging member toward the board to bind or fasten the parts in place.

As instrument boards of various thicknesses are likely to be encountered in fastening an instrument in place, the bridging member 19 is provided with a number of weakened portions 26—26, 27—27, preferably regularly spaced along the sides 20 and 21 of the U. These weakened portions extend across the bottom of the channel and nearly through the sides 22 and 23 thereof, and may conveniently be provided by slitting the sheet before the stamping is folded to shape. The extremities 28—28 of the sides of the U may be readily removed in case the instrument is to be mounted on a thicker board.

In order to further stiffen the bridging member, it is provided with centrally disposed, outwardly directed flanges 29 and 30. These flanges compensate for the weakening brought about by providing a slot 31 in one of the sides of the channel which communicates with an opening 31¹ in the center of the bridging member. This slot and opening are provided for facilitating the assembly of the bridging member with other parts of the instrument.

The mechanism housed within the protecting casing will now be described. A supporting member 32 (Fig. 5), preferably in the form of a sheet metal stamping, serves as a support for the entire mechanism. As here shown, this stamping has a base portion 33, stiffened by corrugations 34 (Fig. 6), a peripheral flange 35 and a pair of upstanding elements 36 and 37 (Fig. 3). These elements are suitably notched at their upper ends as shown at 38 and a dial plate 39 is carried by these notched ends, the dial being spaced above or in front of the base portion.

Figure 4:
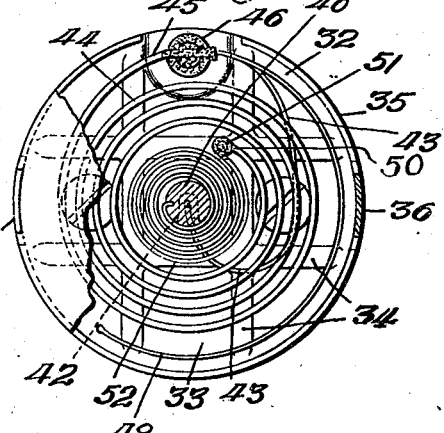
Fig. 4 is a section taken on the broken line 4—4 of Fig. 3, parts being omitted.

This stamping also carries a centrally disposed post 40 (Fig. 3) extending both ways from the base portion. The lower portion of this post is provided with a longitudinal drilling 41 extending up to a lateral opening 42 (Figs. 4 and 5) above the base portion, thereby providing a communicating passage for a pressure communicating tube 43. This tube is carried over to meet the pressure responsive element 44 in the form of a spirally coiled Bourdon tube 45 whose outer end is fixedly mounted on a post 46 mounted on the stamping.

The post 46 shown in Figs. 5, 6, and 7, is suitably fastened to the stamping near the periphery thereof. A portion of the flange 35 may be removed to facilitate this mounting. This post has a slit 47 to receive the Bourdon tube and a drilling 48 to provide soldering space. This Bourdon tube 45 preferably extends slightly beyond the post 46 so that it may be soldered in place independently of the soldering of the tube 43, and the filling tube 49, to the Bourdon tube, thereby rendering it less likely that solder should accidentally enter the Bourdon tube.

Figure 2:
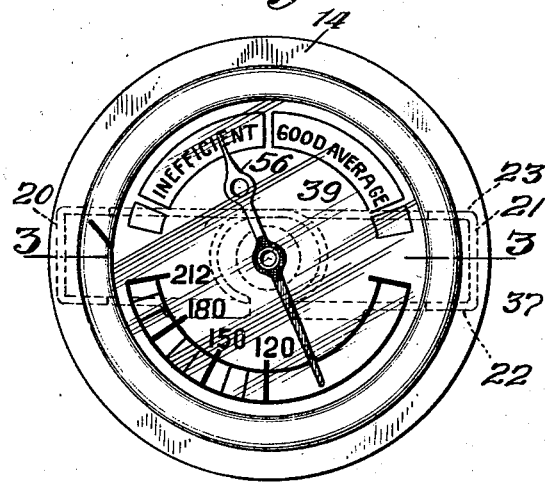
Fig. 2 is a front elevation of the instrument removed from the board.

The inner end 50 of the Bourdon tube is attached, by means of a post 51, to a coiled bimetallic compensating thermostatic member 52 which is coiled about an arbor 53 pivoted on a reduced portion 54 of the central post 40. This provides a bearing pin or post for the arbor and permits it to turn about its axis in response to the operation of the Bourdon tube and the compensating thermostat. This arbor extends through an aperture 55 in the dial plate 39 and is connected to and actuates an indicator hand 56 over the dial, calibrated as shown in Fig. 2. A small spider spring 57 is interposed between the dial plate and the arbor 53 and serves to hold the arbor on the pin 54. This permits ready assembly of the device and allows the parts to readily adjust themselves.

The pressure communicating tube 43 extends out from the passage 41 and is of sufficient length to reach the temperature responsive element at the distant point. This tube is preferably provided with a protecting woven wire sheath 58 which extends into the passage 41. The lower end of the post 40 is provided with a saw cut 59 and after the braided sheath is inserted, pressure is applied to collapse the slit and clamp the sheath in place to prevent unraveling. Prongs 60 (Fig. 5) may also be forced inwardly to grip the braid and prevent its being withdrawn accidentally.

The studs 17 and 18 may conveniently be in the form of machine screws passing through holes 61 in the base portion 33 of the stamping 32. They are preferably threaded through a comparatively heavy disc 62 which may be soldered to the stamping. These studs are therefore rigidly carried by the supporting member 32.

In assembling the instrument, the parts above described as being attached to the stamping 32 are all assembled thereon, whereupon the same may be readily inserted as a unit into the casing 13. The casing preferably fits the stamping 32 closely and hence holds the parts in position. Lock nuts 63 threaded onto studs 17 and 18 may then be tightened in place and the bezel 64 placed in an obvious manner.

This portion of the instrument is then completed and ready for mounting on the instrument board. The bridging member 19 may be readily brought into the proper position by passing the braided tube through the slit 31 and moving the bridging member toward the back of the instrument board, the post 40 entering the opening 31′. The extremities of the bridging member may be removed if found necessary in fitting the instrument to the board.

The distant end of the pressure tube 43 and of the braid 58 pass into a tubular member 65 (Figs. 5 and 9) to which they may be attached in the same manner as to the post 40. This tubular member is threaded onto a cap 66 attached to the bulb 67 and securely fastened by mutilating the parts, as by pinching the metal at 68.

Although I have herein shown and described only one form of instrument embodying my thermometer, it will be understood that many changes and modifications may be made therein, with the scope of the following claims, without departing from the spirit and scope of the invention.

What is claimed is:

1. In an instrument, in combination, a sheet metal stamping having a substantially flat base portion, a peripheral flange, a plurality of upstanding elements extending beyond the flange, a dial plate fastened to the extremities of said elements and thereby held spaced from the base portion, a cup-shaped casing about the stamping, and a central post fastened to said base portion and carrying operating elements in said space.

2. In an instrument, in combination, an inner sheet metal stamping having a substantially flat base portion, a peripheral flange, a plurality of upstanding elements extending beyond the flange, a dial plate fastened to the extremities of said elements and thereby held spaced from the base portion, an outer cup-shaped casing about the stamping, a central post fastened to said base portion and carrying an indicating element above the dial plate, and means for fastening said base portion of the stamping to the bottom of the casing.

3. In an instrument, in combination, an inner sheet metal stamping having a substantially flat base portion, a peripheral flange, a plurality of upstanding elements extending beyond the flange, a dial plate fastened to the extremities of said elements and thereby held spaced from the base portion, an outer cup-shaped casing about the stamping, said casing having an outwardly directed flange, a central post fastened to said base portion and carrying an indicating element above the dial plate, members passing through said base portion of the inner stamping and the bottom of the casing to fasten the casing and stamping together, said members extending beyond the casing, and a clamping member engaging said members and adapted to engage an instrument board interposed between said clamping member and the flange on the casing.

4. In an instrument, in combination, a sheet metal stamping having a substantially flat base portion, a peripheral flange, a plurality of upstanding elements extending beyond the flange, a dial plate fastened to the extremities of said elements and thereby held spaced from the base portion, a post attached to the base portion, an indicating or actuating pivot on the post, and, an indicator above the dial plate.

5. In an instrument, in combination, a sheet metal stamping having a substantially flat base portion, a peripheral flange, upstanding elements extending therefrom, a dial plate fastened to the extremities of said elements and thereby held spaced from the base portion, a post attached to the base portion, an indicator actuating element pivoted on the post, and a spring interposed between the dial plate and element for holding the element on the post.

6. In an instrument, in combination, a sheet metal stamping having a substantially flat base portion, a peripheral flange, a plurality of upstanding elements extending beyond the flange, a dial plate fastened to the extremities of said elements and thereby held spaced from the base portion, a post attached to the base portion, a pressure communicating element extending through the post, a pressure responsive element located in said space and supported from the base portion and attached to the pressure communicating element, an indicator actuating element pivoted on the post operated by the pressure responsive element and an indicator carried above the dial plate operatively connected with the pressure responsive element.

7. In an instrument, in combination, a casing, a post supported from the casing and extending from the outside thereof to the interior, a pressure communicating element extending through the post, a braided sheath surrounding said element, means on the outer end of the post for fastening and supporting the braided sheath, and an indicating element pivoted on the post inside the casing.

8. A distance-type thermometer having a unitary centrally disposed post; a supporting member fastened thereto, a second post also fastened to said member, a pressure responsive element coiled about the first post and supported from the second post, and a pressure tube passing through longitudinal and lateral drillings in the central post and attached to the pressure responsive element.

9. In an instrument, the combination of a fixed dial plate having an aperture therethrough, an indicator carried above the dial plate, actuating mechanism for the indicator communicating through an aperture in the plate with said indicator, said actuating mechanism including a pivoted member, and a spring interposed between the plate and said member to hold the member in position.

10. An instrument having a fixed pivot post, an indicator operating element pivoted on the post, means for moving the element angularly, a dial plate mounted substantially at right angles to the post, means supporting the dial plate in fixed relation to the post, and a spring interposed between the plate and element to hold the element on the post.

11. In an instrument, a fixedly mounted central post, whose free end is in the form of a pivot pin of a reduced diameter, an indicator operating element mounted on the pin, a member positioned beyond the element, means supporting said member in fixed relation to the pin, and a spring interposed between the element and member for holding the element on the pin.

12. In a distance type thermometer an indicating instrument comprising a main post, a casing, and mechanism within the casing mounted on said main post, a temperature responsive element remote from the instrument, a capillary tube operatively connecting the element and the instrument, protective braid encasing the tube, said tube entering the instrument through the main post, the main post projecting to the exterior of the instrument casing and having the end of its external portion split and deformed to pinch the braid for preventing unravelling thereof.

13. In a distance type thermometer, the combination with an indicating instrument of a temperature responsive element, a capillary tube operatively connecting said instrument and element, protective braid encasing the capillary tube, and means secured on the element stem for pinching the protective braid to prevent unravelling thereof.

14. In a distance type thermometer the combination with an indicating instrument of a temperature responsive element, a capillary tube operatively connecting said instrument and element, protective braid encasing the capillary tube, and means forming part of the instrument constructed to pinch the braid on the tube to prevent unravelling thereof.

15. In a distance type thermometer a temperature responsive member, an indicating member remote therefrom, a capillary tube operatively connecting said members, protective braid encasing said tube, and means for securing the ends of said braid against unravelling comprising a hollow element secured to one of said members and having a split end constructed to be forced or clamped against said braid.

16. In a distance type thermometer a temperature responsive member, an indicating member remote therefrom, a capillary tube operatively connecting said members, protective braid encasing said tube, and means for securing the ends of said braid against unravelling comprising a hollow element secured to one of said members and having a longitudinal saw cut at one end providing segments which may be forced toward one another to clamp the braid.

17. In a distance type thermometer a temperature responsive member, an indicating member remote therefrom, a capillary tube operatively connecting said members, protective braid encasing said tube and means for securing the ends of said braid against unravelling, comprising a hollow element secured to one of said members and having inwardly directed prongs arranged to be forced against the braid.

In testimony whereof I have affixed my signature to this specification.

HERMAN SCHLAICH.